July 30, 1963     J. H. HOFFMANN     3,099,760

STATOR CORE SHIMS ON DYNAMOELECTRIC MACHINES

Filed Nov. 29, 1961

Inventor
Jack H. Hoffmann
By Robert P. Benson
Attorney

United States Patent Office 3,099,760
Patented July 30, 1963

3,099,760
STATOR CORE SHIMS ON DYNAMOELECTRIC MACHINES
Jack H. Hoffmann, West Allis, Wis., assignor to Allis-Chalmers Manufacturing Company, Milwaukee, Wis.
Filed Nov. 29, 1961, Ser. No. 155,577
9 Claims. (Cl. 310—217)

This invention relates generally to cores for dynamoelectric machines. More specifically this invention relates to shims used in clamping large stator cores and dynamoelectric machines.

In stator cores of large dynamoelectric machines made of stacks of laminations, there is a build-up of material at the inner or tooth area of the core which causes an overall length differential between the inner and outer portions of the core. In practice, the length differential is as much as 3/4 of an inch in a 90 inch core. Because of this length differential, it is extremely difficult to get a good uniform clamping of the core. If the core is not firmly clamped, the loose laminations in the core vibrate during the operation of the machine setting up a loud and very disturbing noise. Furthermore, as these laminations vibrate the entire core structure loosens which in turn increases vibrations of the laminations and the noise. This chain reaction continues until the noise reaches an unacceptable level and the machine is shut down and the core tightened.

The greatest need for adjustment in the core length occurs after the core has been assembled and run for a period of time. However, since the core is assembled in a shell, and the length differential is such that the outer portion of the core is shorter than the inner portion and hence requires more shim thickness, it is extremely difficult to position shims in the core because these shims have to be inserted from the bore of the core.

The shims of this invention overcome the problem mentioned above because each individual shim is substantially flat and the extra thickness at the outer surface or rim of the core is obtained by forcing the ends of one shim member to overlap a portion of another shim member. One of the shims can be provided with a tapered edge to facilitate assembly. The overlapping portions are only at the outer edge and the nonoverlapping shim portions are at the bore of the core. Therefore, the shimming effect is twice as much at the outer surface as it is at the inner surface. By properly choosing the size of shims utilized, the overall length of the core can be balanced and the core more uniformly clamped. It has been found in actual practice that the use of these shims, after the core has been in service for a year or more, has been sufficient to avoid further modifications of the core after it has been put into continuous service.

Therefore, it is the object of this invention to provide a new and improved core for dynamoelectric machines.

Another object of this invention is to provide a new and improved clamping means for the cores of dynamoelectric machines in which the stator coils are assembled.

Another object of this invention is to provide new and improved shims for clamping the cores of dynamoelectric machines to more effectively apply pressure to the core and thereby increase its rigidity.

Other objects and advantages of this invention will be apparent from the following description when read in connection with the accompanying drawings, in which.

Figure 2:
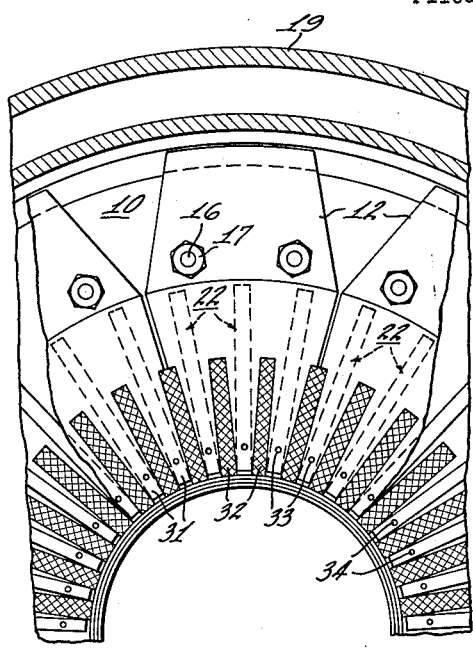
FIG. 2 is a cross sectional view taken along the line II—II of FIG. 1.
Figure 1:
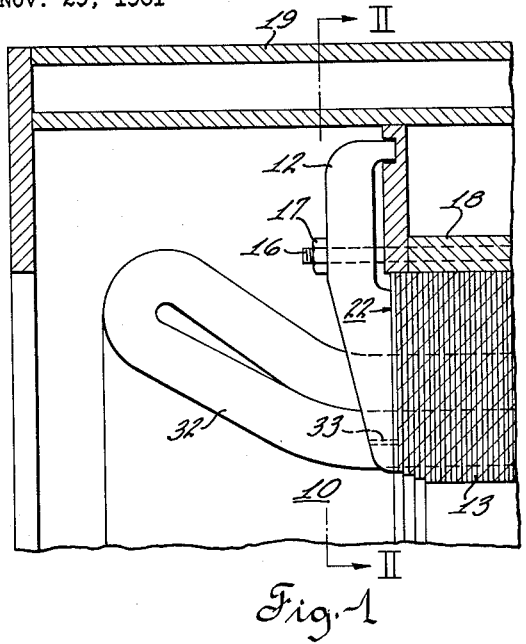
FIG. 1 is a cross sectional view of a portion of a stator core embodying the shims and the clamping mechanism of this invention.

The shims of this invention are illustrated in connection with a stator core 10 of a larger generator having annular clamping or finger plates 12 at either end which are clamped against the core laminations 13 to hold the core together. As shown in the drawing, these clamping plates 12 may be made in sections that combine to form a substantially annular ring. The finger plates 12 are clamped against the laminations by the use of a stud 16 and nut 17 arrangement. The stud extends through the finger plate 12 and is anchored in a beam 18 of the stator yoke and the nut engages the stud and abuts the outside of the finger plate to draw it inward toward the laminations 13.

The shims 22 of this invention are inserted between the end laminations 13 and the finger plate 12. They are normally positioned in the core after the core has been in operation for some time because during the initial run the lamiations vibrate and remove from each other many of the irregularities which cause the core to be nonuniform in length. After the initial run, the core is much looser and can be more securely clamped by increasing the pressure on the finger plate. However, before reclamping the core is shimmed to balance the overall length of the core and provide a more uniform surface on which to apply pressure.

The shims comprise generally two flat pieces, one of which is T-shaped 23 and the other of which is U-shaped 24. The shims can be made of any suitable material such as stainless steel. The T-shaped member has a crossbar 25 and a stem 26 extending therefrom. The U-shaped member 24 comprises a pair of spaced apart legs 27 connected together at one end by a connecting bridge 28. The T-shaped member 23 is inserted first and is pushed between the end laminations 13 of the core 10 and the finger plate 12 radially outward until the crossbar 25 is at the outer rim of the core laminations 13. The T-shaped member is positioned with its stem 26 substantially on a radius of the core. The U-shaped member 24 is then forced radially outward to a position where the free ends of the legs 27 of the U-shaped member overlap the crossbar 25 of the T-shaped member. In this position the stem of the T-shaped member fits between the legs of the U-shaped member and there is no overlapping of the shims in the radially inner portion of the core. Furthermore, the width of the U-shaped member 24 is slightly less than the width of the teeth 31 of the core 10 so that the shims can be easily positioned adjacent the core without interfering in any way with the windings 32 which extend outward from the end of the core.

Figure 5:
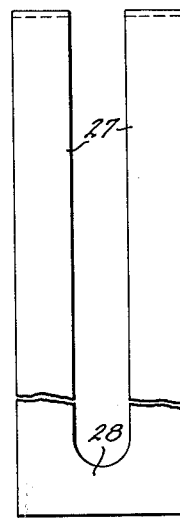
FIG. 5 is a front view of the U-shaped shim member of this invention.
Figure 6:
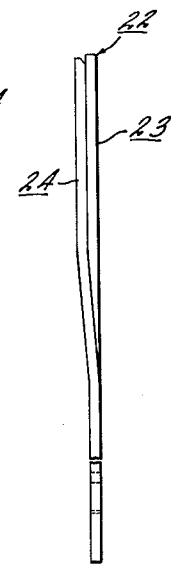
FIG. 6 is a side view of the shims in their assembled position.

As shown in FIGS. 5 and 6, the extreme ends of the legs 27 of the U-shaped member may be slightly tapered and the inner portion of the crossbar of the T-shaped member may also be tapered to aid in guiding the U-shaped member past the crossbar of the T-shaped member to simplify the assembly of the shims into the core. Furthermore, the thickness of the shims can be any desired value depending on the amount of difference between the length of the outside portion of the core and the inside portion of the core. Preferably the thickness of each shim portion will equal one-half the length differential of the core.

In operation, the core laminations 13 are assembled inside a shell or yoke 19 and clamped therein by positioning the finger plates 12 around the ends of the core and then forcing the finger plate against the laminations by use of the stud 16 and nut 17 clamping arrangement. Then the machine is run during which time the vibrations of the individual laminations loosen the core. These vibrations also remove many of the irregularities on the laminations and further change the overall length differential of the core. Then one of the finger plates 12 is backed away from the core 10 and measurements are made to determine the length difference between the inner and outer portions of the core.

Figures 3, 4:
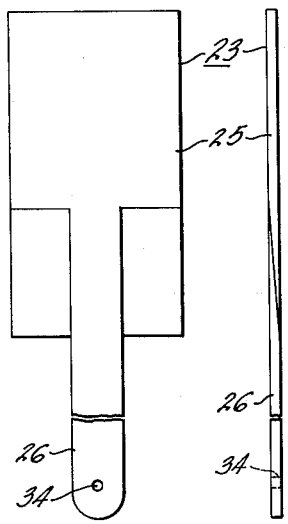
FIG. 3 is a front view of the T-shaped shim member of this invention.
FIG. 4 is a side view of the T-shaped shim of FIG. 3.

The shims 23, 24 are then formed in accordance with the determined length differential so that preferably each shim is approximately one-half of the difference in length of the core. However, because of the limited working space between the end of the core and the winding clamps the size of the shims frequently has to be less than one-half the length differential in the core 10. The height of the crossbar 25 in the T-shaped member 23 is preferably made to equal about one-quarter of the length of the T-shaped member from the top to the end of the stem. The bottom edge of the crossbar may be tapered slightly as shown in FIG. 3 to aid in positioning the legs of the U-shaped member 24. Of course, the leading edge of the legs 27 could be tapered rather than or in addition to the crossbar to facilitate the assembly of the shims. The shim members are then positioned between the end of the core laminations 13 and the finger plate 12. This is accomplished by inserting the T-shaped member first and positioning it on radii bisecting a tooth 31 of the core 10. Then the U-shaped member is inserted alongside the same tooth but very carefully to avoid making any contact with the windings 32 extending from the core. When the shims are positioned they are held in place by pins 33 that extend through the finger plate 12 and engage a hole 34 in one of the shim members 23 or 24. The U-shaped member is narrower than the width of the tooth and is positioned on a radii such that the ends of the U-shaped member overlap the crossbar of the T and the bottom of the U is positioned just above the bore of the core. In this position the stem of the T fits between the legs of the U-shaped member.

The above procedure is followed on each tooth at both ends of the core. When all the shims have been positioned, the finger plates are again tightened down against the end of the core. In its final clamped position when the nuts 17 have been tightened down against the finger plates 12, the length of the core is substantially equal at both its inner and outer portions. Furthermore, the finger plate 12 is exerting a substantially uniform pressure on all portions of the core thereby making it much firmer throughout. Hence, the core will vibrate less and cause much less noise.

Although but one embodiment of this invention has been illustrated and described, it will be obvious to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. Shims for a core of a dynamoelectric machine comprising: a flat T-shaped member having a stem and a crossbar, a flat U-shaped member having a pair of spaced apart legs connected at one end, said members being adapted to be positioned adjacent the end of the core with the free ends of said legs of said U-shaped member overlapping said crossbar of said T-shaped member, and with said stem of said T-shaped member fitting intermediate said legs of said U-shaped member.

2. Shims for a core of a dynamoelectric machine comprising: a substantially flat T-shaped member having a stem and a crossbar, a substantially flat U-shaped member having a pair of spaced apart legs connected at one end, said members being adapted to be positioned adjacent the end of the core with the free ends of said legs of said U-shaped member overlapping said cross bar of said T-shaped member, the inner edge of said crossbar being tapered to facilitate assembly, and with said stem of said T-shaped member fitting intermediate said legs of said U-shaped member.

3. Shims for a core of a dynamoelectric machine comprising: a substantially flat T-shaped member having a stem and a crossbar, a substantially flat U-shaped member having a pair of spaced apart legs connected at one end, said members being adapted to be positioned adjacent the end of the core with the free ends of said legs of said U-shaped member overlapping said crossbar of said T-shaped member, said free ends of said legs being tapered to facilitate assembly, and with said stem of said T-shaped member fitting intermediate said legs of said U-shaped member.

4. Shims for a core of a dynamoelectric machine comprising: a flat T-shaped member having a stem and a crossbar, the height of said crossbar being substantially equal to one-fourth the overall length of said T-shaped member, a flat U-shaped member having a pair of spaced apart legs connected at one end, said members being adapted to be positioned adjacent the end of the core with the free ends of said legs of said U-shaped member overlapping said crossbar of said T-shaped member, and with said stem of said T-shaped member fitting intermediate said legs of said U-shaped member.

5. In a dynamoelectric machine comprising: a laminated core having teeth at its radially inner surface that cooperate to form winding slots and clamping plates at either end of said core; pairs of shims, each pair of shims comprising a T-shaped member having a stem and a crossbar and a U-shaped member having a pair of spaced apart legs connected at one end, the width of said U-shaped member being less than the width of the teeth of said core, a pair of said shims being positioned on a radii of said core and adjacent each tooth of said core between said core and said clamping plates; the crossbar of said T-shaped member being positioned at the radially outer surface of said core and the connecting portion of said U-shaped member being positioned at the radially inner surface of said core with the ends of said legs overlapping said crossbar to provide a greater shim thickness at the outer edge of said core than at the inner edge of said core.

6. In a dynamoelectric machine comprising: a laminated core having teeth at its radially inner surface that cooperate to form winding slots and clamping plates at either end of said core; pairs of shims, each pair of shims comprising a T-shaped member having a stem and a crossbar and a U-shaped member having a pair of spaced apart legs connected at one end, the width of said U-shaped member being less than the width of the teeth of said core, a pair of said shims being positioned on a radii of said core and adjacent each tooth of said core between said core and said clamping plates; the crossbar of said T-shaped member being positioned at the radially outer surface of said core and the connecting portion of said U-shaped member being positioned at the radially inner surface of said core with the ends of said legs overlapping said crossbar to provide a greater shim thickness at the outer edge of said core than at the inner edge of said core, the inner edge of said crossbar being tapered to facilitate assembly.

7. In a dynamoelectric machine comprising: a laminated core having teeth at its radially inner surface that cooperate to form winding slots and clamping plates at either end of said core; pairs of shims, each pair of shims comprising a T-shaped member having a stem and a crossbar and a U-shaped member having a pair of spaced apart legs connected at one end, the width of said U-shaped member being less than the width of the teeth of said core, a pair of said shims being positioned on a radii of said core and adjacent each tooth of said core between said core and said clamping plates; the crossbar of said T-shaped member being positioned at the radially outer surface of said core and the connecting portion of said U-shaped member being positioned at the radially inner surface of said core, the ends of said legs overlapping said crossbar to provide a greater shim thickness at the outer edge of said core than at the inner edge of said core, said free ends of said legs being tapered to facilitate assembly.

8. In a dynamoelectric machine comprising: a laminated core having teeth at its radially inner surface that cooperate to form winding slots and clamping plates at either end of said core, the length of said core being greater at its radially inner surface than at its radially outer surface, pairs of shims, each pair of said shims comprising a T-shaped member having a stem and a crossbar, and a U-shaped member having a pair of spaced apart legs connected at one end, the width of said U-shaped member being less than the width of the teeth of said core, a pair of said shims being positioned on a radii of said core and along each tooth of said core between said core and said clamping plates; the crossbar of said T-member being positioned at the radially outer surface of said core and the connecting portion of said U-shaped member being positioned at the radially inner surface of said core, the ends of said legs overlapping said crossbar to provide a greater shim thickness at the outer edge of said core than at the inner edge of said core.

9. In a dynamoelectric machine comprising: a laminated core having teeth at its radially inner surface that cooperate to form winding slots, said core having a greater length at its radially inner surface than at its outer surface, clamping plates at either end of said core, pairs of shims, each pair of said shims comprising a T-shaped member having a stem and a crossbar, and a U-shaped member having a pair of spaced apart legs connected at one end, the width of said U-shaped member being less than the width of the teeth of said core, said shims having a thickness substantially equal to one-half the length differential of said core, a pair of said shims being positioned on a radii of said core and along each tooth of said core between said core and said clamping plates; the crossbar of said T-shaped member being positioned at the radially outer surface of said core and the connecting portion of said U-shaped member being positioned at the radially inner surface of said core, the ends of said legs overlapping said crossbar to provide a greater shim thickness at the outer edge of said core than at the inner edge of said core.

No references cited.